(12) United States Patent
Kou et al.

(10) Patent No.: US 9,063,860 B2
(45) Date of Patent: Jun. 23, 2015

(54) METHOD AND SYSTEM FOR OPTIMIZING PREFETCHING OF CACHE MEMORY LINES

(75) Inventors: Leigang Kou, Austin, TX (US); Jeff Wiedemeier, Austin, TX (US); Mike Filippo, Driftwood, TX (US)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 13/078,356

(22) Filed: Apr. 1, 2011

(65) Prior Publication Data

US 2012/0254540 A1 Oct. 4, 2012

(51) Int. Cl.
*G06F 12/08* (2006.01)
*G06F 12/02* (2006.01)
*G06F 9/38* (2006.01)

(52) U.S. Cl.
CPC ........ *G06F 12/0862* (2013.01); *G06F 12/0215* (2013.01); *G06F 9/383* (2013.01); *G06F 2212/6028* (2013.01); *G06F 12/0864* (2013.01); *G06F 2212/6026* (2013.01)

(58) Field of Classification Search
CPC ............ G06F 12/0215; G06F 12/0848; G06F 12/0862; G06F 9/383; G06F 2212/6028; G06F 2212/6026; G06F 12/0864
USPC ................... 711/119, 122, E12.017, E12.057
See application file for complete search history.

(56) References Cited

U.S. PATENT DOCUMENTS

| | | | |
|---|---|---|---|
| 4,381,541 A * | 4/1983 | Baumann et al. | 711/128 |
| 5,689,653 A | 11/1997 | Karp et al. | |
| 6,009,510 A | 12/1999 | Henry et al. | |
| 6,708,269 B1 * | 3/2004 | Tiruvallur et al. | 712/225 |
| 6,915,385 B1 | 7/2005 | Leasure et al. | |
| 2004/0133747 A1 * | 7/2004 | Coldewey | 711/137 |
| 2009/0070556 A1 * | 3/2009 | Griswell et al. | 712/207 |
| 2009/0198903 A1 * | 8/2009 | Arimilli et al. | 711/137 |
| 2011/0161587 A1 * | 6/2011 | Guthrie et al. | 711/122 |

FOREIGN PATENT DOCUMENTS

| | | |
|---|---|---|
| JP | 09-114733 A | 5/1997 |
| WO | 2012/135429 A2 | 10/2012 |
| WO | 2012/135429 A3 | 12/2012 |

OTHER PUBLICATIONS

International Search Report and Written Opinion received for PCT Patent Application No. PCT/US2012/031093, mailed on Oct. 25, 2012, 5 pages.

International Preliminary Report on Patentability received for PCT Patent Application No. PCT/US2012/031093, mailed on Oct. 10, 2013, 6 pages.

* cited by examiner

*Primary Examiner* — Reginald Bragdon
*Assistant Examiner* — Mehdi Namazi
(74) *Attorney, Agent, or Firm* — Lowenstein Sandler LLP

(57) ABSTRACT

A method and system to optimize prefetching of cache memory lines in a processing unit. The processing unit has logic to determine whether a vector memory operand is cached in two or more adjacent cache memory lines. In one embodiment of the invention, the determination of whether the vector memory operand is cached in two or more adjacent cache memory lines is based on the size and the starting address of the vector memory operand. In one embodiment of the invention, the pre-fetching of the two or more adjacent cache memory lines that cache the vector memory operand is performed using a single instruction that uses one issue slot and one data cache memory execution slot. By doing so, it avoids additional software prefetching instructions or operations to read a single vector memory operand when the vector memory operand is cached in more than one cache memory line.

20 Claims, 2 Drawing Sheets

METHOD AND SYSTEM FOR OPTIMIZING PREFETCHING OF CACHE MEMORY LINES

FIELD OF THE INVENTION

This invention relates to a processing unit, and more specifically but not exclusively, to a method and system to optimize prefetching of cache memory lines in the processing unit.

BACKGROUND DESCRIPTION

A processor may use software prefetching of vector memory operand(s) to improve the bandwidth of data processing. The vector memory operand often has a width of 64 bytes and is aligned to an element width such as 4 bytes or 8 bytes.

However, when the vector memory operand is unaligned with the cache memory line boundary, two software prefetch instructions are needed to fetch or retrieve one vector memory operand. This consumes two issue slots and two cache memory execution slots and could cause significant performance loss of the processing unit. When vector memory operand is aligned to the cache memory line boundary, software is required to know the actual alignment of the data of the vector memory operand in order to perform an accurate prefetching without issuing too many prefetching instructions.

BRIEF DESCRIPTION OF THE DRAWINGS

The features and advantages of embodiments of the invention will become apparent from the following detailed description of the subject matter in which.

DETAILED DESCRIPTION

Figure 1:
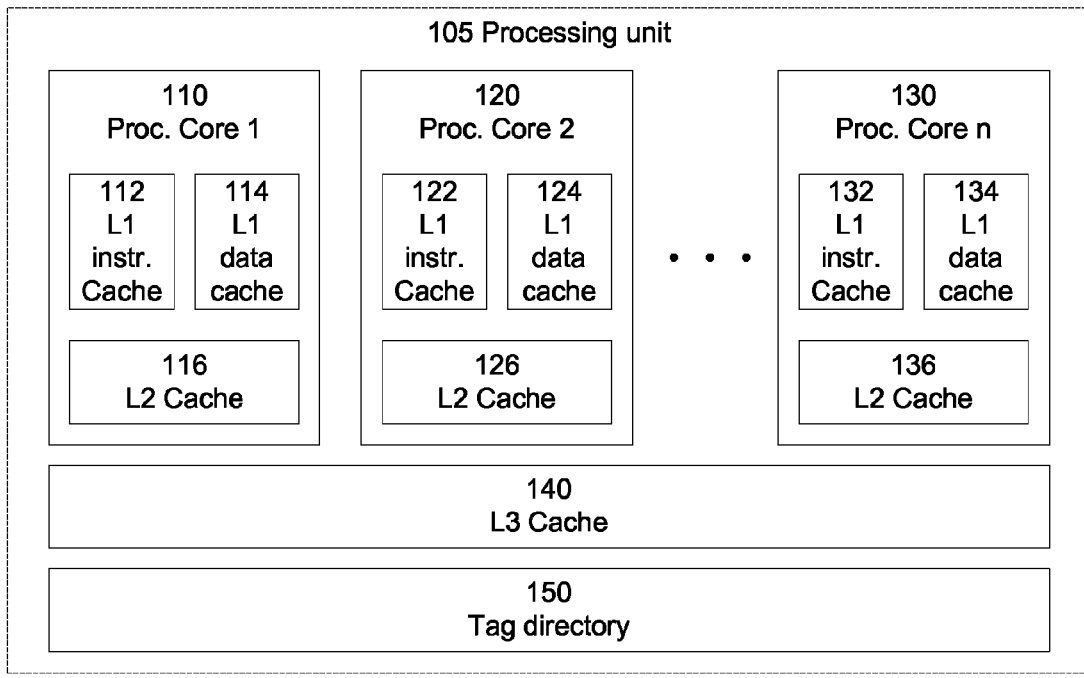
FIG. 1 illustrates a block diagram of a processing unit in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment. The term "unaligned cache memory access" used herein means that the required data is cached in two or more cache memory lines of the cache memory in one embodiment of the invention. The term "vector memory operand" refers to a data source having two or more data words in one embodiment of the invention.

Embodiments of the invention provide a method and system to optimize prefetching of cache memory lines in a processing unit. In one embodiment of the invention, the processing unit has logic to determine whether a vector memory operand is cached in two or more adjacent cache memory lines. In one embodiment of the invention, the determination of whether the vector memory operand is cached in two or more adjacent cache memory lines is based on the size and the starting address of the vector memory operand. In one embodiment of the invention, the pre-fetching of the two or more adjacent cache memory lines that cache the vector memory operand is performed using a single instruction that uses one issue slot and one data cache memory execution slot.

By doing so, it avoids additional software prefetching instructions or operations to read a single vector memory operand when the vector memory operand is cached in more than one cache memory line. In one embodiment of the invention, a single read port of a cache tag memory is sufficient to facilitate access of a vector memory operand that is cached in two or more cache memory lines.

In one embodiment of the invention, the cache memory is a level one (L1) cache memory. In another embodiment of the invention, the cache memory is a level two (L2) cache memory. One of ordinary skill in the relevant art will readily appreciate that the cache memory may also be of higher orders or levels without affecting the workings of the invention.

FIG. 1 illustrates a block diagram 100 of a processing unit 105 in accordance with one embodiment of the invention. The processing unit 105 has processing core 1 110 and processing core 2 120. The processing core n 130 illustrates that there can be more than two processing cores in one embodiment of the invention. In another embodiment of the invention, the processing unit 105 has only one processing core.

The processing core 1 110 has a L1 instruction cache memory 112, a L1 data cache memory 114, and a L2 cache memory 116. The processing core 2 120 and the processing core n 130 have a similar structure as the processing core 1 110 and shall not be described herein. In one embodiment of the invention, the processing unit 105 has a level three (L3) cache memory 140 that is shared among the processing cores 1 110, 2 120 and n 130. The processing unit 105 has an optional cache memory tag directory 150 that keeps track of all the cache memory lines in the cache memories of the processing cores.

In one embodiment of the invention, the processing unit 105 has logic to receive a request or instruction to access data that is cached in two or more adjacent cache memory lines of the L1 data cache memories 114, 124 and 134. The logic of the processing unit 105 pre-fetches two or more adjacent cache memory lines that are to cache the data using a single data cache memory execution slot in one embodiment of the invention. In one embodiment of the invention, the request or instruction is a load instruction. The size of the data to be access is provided as a parameter in one embodiment of the invention.

In another embodiment of the invention, the processing unit 105 has logic to receive a request or instruction to access data that is cached in two or more adjacent cache memory lines of the L2 cache memories 116, 126 and 136. The logic of the processing unit 105 pre-fetches two or more adjacent cache memory lines that are to cache the data using a single data cache memory execution slot in one embodiment of the invention. In yet another embodiment of the invention, the processing unit 105 has logic to receive a request or instruction to access data that is cached in two or more adjacent cache memory lines of the L3 cache memory 140.

The processing unit 105 illustrated in FIG. 1 is not meant to be limiting. For example, in one embodiment of the invention, the processing unit 105 does not have the L3 cache memory 140. One of ordinary skill in the relevant art will readily appreciate that other configurations of the processing unit 105 can be used without affecting the workings of the invention and these other configurations shall not be described herein.

Figure 2:
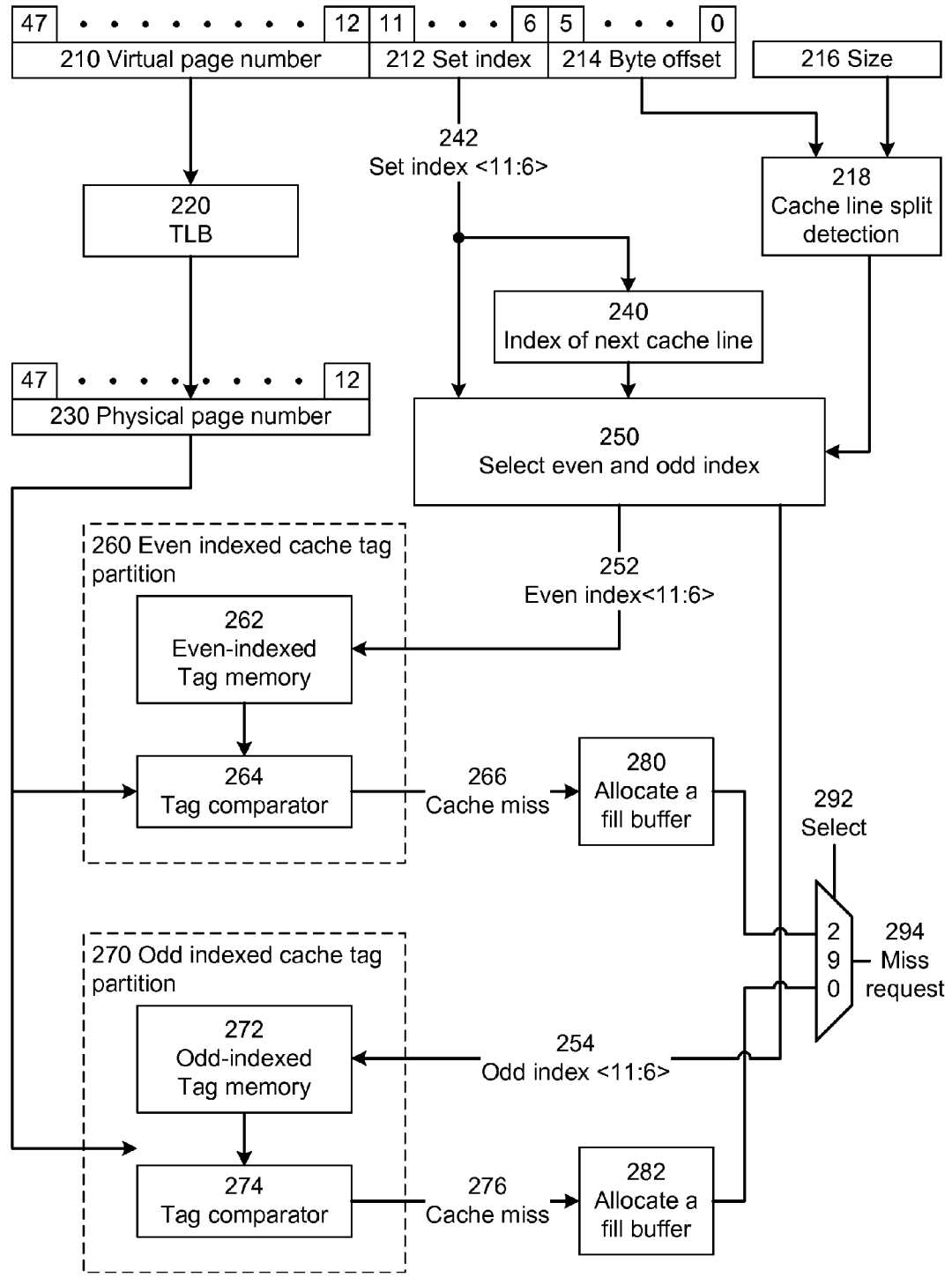
FIG. 2 illustrates a block diagram of a cache tag memory in accordance with one embodiment of the invention.

FIG. 2 illustrates a block diagram 200 of the cache tag memory in accordance with one embodiment of the invention. For clarity of illustration, a prefetch instruction or request to access a vector memory operand that is cached in two cache memory lines has been received for the scenario described in FIG. 2. The linear address (LA) of the vector memory operand has a byte offset 214, a set index 212 and a virtual page number 210.

In one embodiment of the invention, the LA has forty eight bits. Bit zero to bit five of the LA, i.e., LA[5:0], is the byte offset 214. Bit six to bit eleven of the LA, i.e., LA[11:6], is the set index 212. Bit twelve to bit forty seven of the LA, i.e., LA[47:12], is the virtual page number 210.

In one embodiment of the invention, the cache tag memory has an even indexed cache tag partition 260 and an odd indexed cache tag partition 270. The even indexed cache tag partition 260 has entries that correspond to cache memory lines that have an even set index in one embodiment of the invention. The odd indexed cache tag partition 270 has entries that correspond to cache memory lines that have an odd set index in one embodiment of the invention.

The partitioning of the cache tag memory into the even indexed cache tag partition 260 and an odd indexed cache tag partition 270 facilitates access of the vector memory operand in one embodiment of the invention. It enables the cache tag memory lookup of the two adjacent cache memory lines that are caching the data of the vector memory operand in one embodiment of the invention.

In one embodiment of the invention, the cache memory line split detection logic 218 uses the size 216 of the vector memory operand and the byte offset 214 to determine whether the vector memory operand is cached in two or more cache memory lines. The size 216 of the vector memory operand is determined from the prefetch request in one embodiment of the invention. For example, assuming that a particular cache memory has a cache width of 64 bytes, and assuming that the size and starting address of the vector memory operand is 2 bytes and 0x3F respectively, the cache memory line split detection logic 218 determines that the vector memory operand is cached in two adjacent cache memory lines. This is because the address of the first byte of the vector memory operand is at address 0x3F and the address of the second byte of the vector memory operand is at address 0x40 and these two addresses belong to two adjacent cache memory lines, i.e., the first and the second cache memory lines of the particular cache memory.

In one embodiment of the invention, the set index <11:6> 242 is used to determine the set index of the next or adjacent cache memory line 240. The select even and odd index module 250 has two inputs, i.e., the set index <11:6> 242 and the set index of the next or adjacent cache memory line 240. The output of the cache memory line split detection logic 218 is the control signal of the select even and odd index module 250 in one embodiment of the invention. The set index <6> is the least significant bit of the set index 212 and the select even and odd index module 250 uses the set index <6> to determine whether the value of the set index 212 is even or odd in one embodiment of the invention.

When the cache memory line split detection logic 218 has determined that the vector memory operand in the prefetch request is cached in two adjacent cache memory lines, it sends a signal or indication to the select even and odd index module 250 that the two adjacent cache memory lines are required to be assessed to obtain the data of vector memory operand. In one embodiment of the invention, the select even and odd index module 250 sends the even index <11:6> 252 to the even indexed cache tag partition 260 and sends the odd index <11:6> 254 to the odd indexed cache tag partition 270. The even index <11:6> 252 is selected between the set index <11:6> 242 and the set index of the next or adjacent cache memory line 240 that has an even index value. The odd index <11:6>252 is selected between the set index <11:6> 242 and the set index of the next or adjacent cache memory line 240 that has an odd index value.

When the cache memory line split detection logic 218 has determined that the vector memory operand in the prefetch request is cached in only one cache memory line, it sends a signal or indication to the select even and odd index module 250 that only one cache memory line is required to be assessed to obtain the data of vector memory operand. In one embodiment of the invention, the select even and odd index module 250 determines whether the set index <11:6> 242 is odd or even and send either the corresponding even index <11:6> 252 to the even indexed cache tag partition 260 or the corresponding odd index <11:6>254 to the odd indexed cache tag partition 270.

In one embodiment of the invention, the virtual page number 210 is translated or converted to a physical page number 230 using a translation look aside buffer (TLB) 220. The physical page number 230 is sent to both the even indexed cache tag partition 260 and the odd indexed cache tag partition 270.

In one embodiment of the invention, the even indexed cache tag partition 260 has an even indexed tag memory 262 and a tag comparator 264. The tag comparator 264 compares the entries in the even indexed tag memory 262 with the physical page number 230 to determine if there is a match. If there is a match, i.e., a cache memory hit, the cached data in the data cache memory is retrieved or read. If there is no match, i.e., a cache memory miss, a cache miss signal or indication 266 is sent to the module 280 that allocates a fill buffer for the cache memory line. The cache miss signal 266 is forwarded by the module 280 to the multiplexer 290.

In one embodiment of the invention, the odd indexed cache tag partition 270 has an odd indexed tag memory 272 and a tag comparator 274. The tag comparator 274 compares the entries in the odd indexed tag memory 272 with the physical page number 230 to determine if there is a match. If there is a match, i.e., a cache memory hit, the cached data in the data cache memory is retrieved or read. If there is no match, i.e., a cache memory miss, a cache miss signal or indication 276 is sent to the module 282 that allocates a fill buffer for the cache memory line. The cache miss signal 276 is forwarded by the module 280 to the multiplexer 290.

The select signal 292 of the multiplexer 294 selects between the cache miss signal 266 and the cache miss signal 276 as the cache miss request 294 in one embodiment of the invention. The cache miss request 294 is added into the cache miss queues in one embodiment of the invention.

The illustration in FIG. 2 is not meant to be limiting and other configurations can be used without affecting workings of the invention. For example, the cache tag memory can be divided into more than two partitions if the data of the vector memory operand is cached in more than two cache memory lines. One of ordinary skill in the relevant art will readily appreciate how to combine data from more than two cache memory lines and it shall not be described herein.

Figure 3:
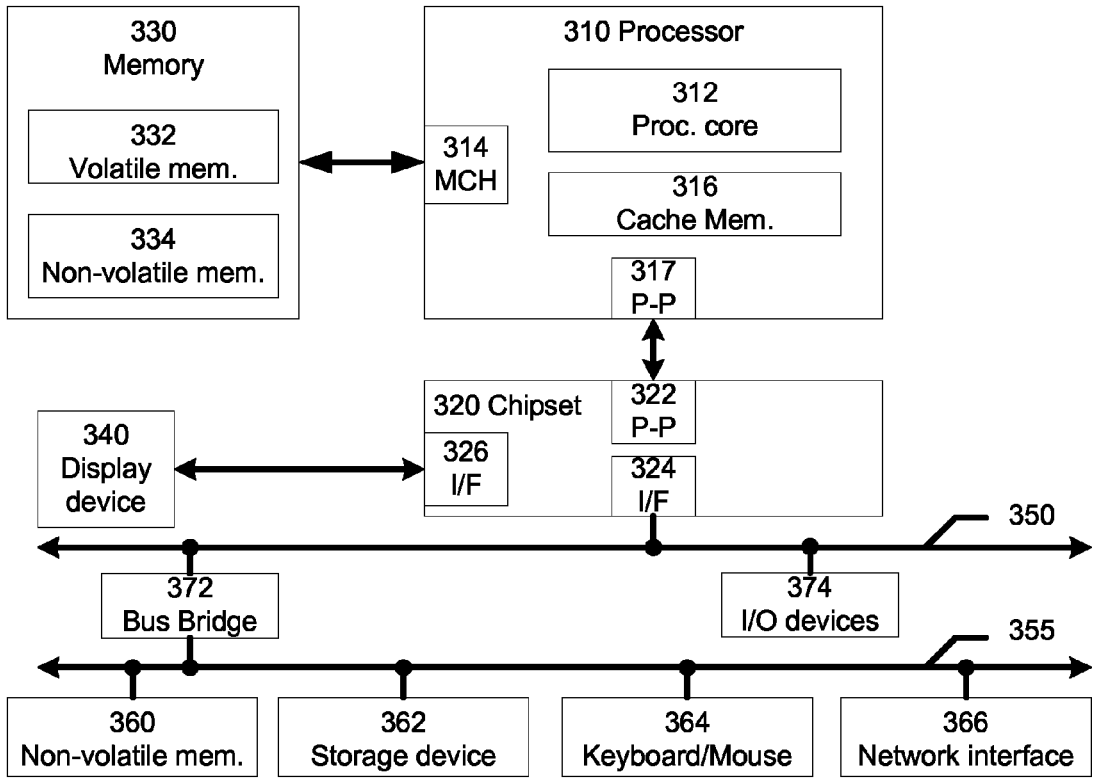
FIG. 3 illustrates a system to implement the methods disclosed herein in accordance with one embodiment of the invention.

FIG. 3 illustrates a system 300 to implement the methods disclosed herein in accordance with one embodiment of the invention. The system 300 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 300 used to implement the methods disclosed herein may be a system on a chip (SOC) system.

The processor 310 has a processing core 312 to execute instructions of the system 300. The processing core 312 includes, but is not limited to, pre-fetch logic to fetch instructions, decode logic to decode the instructions, execution logic to execute instructions and the like. The processor 310 has a cache memory 316 to cache instructions and/or data of the system 300. In another embodiment of the invention, the cache memory 316 includes, but is not limited to, level one, level two and level three, cache memory or any other configuration of the cache memory within the processor 310.

The memory control hub (MCH) 314 performs functions that enable the processor 310 to access and communicate with a memory 330 that includes a volatile memory 332 and/or a non-volatile memory 334. The volatile memory 332 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 334 includes, but is not limited to, NAND flash memory, phase change memory (PCM), read only memory (ROM), electrically erasable programmable read only memory (EEPROM), or any other type of non-volatile memory device.

The memory 330 stores information and instructions to be executed by the processor 310. The memory 330 may also stores temporary variables or other intermediate information while the processor 310 is executing instructions. The chipset 320 connects with the processor 310 via Point-to-Point (PtP) interfaces 317 and 322. The chipset 320 enables the processor 310 to connect to other modules in the system 300. In one embodiment of the invention, the interfaces 317 and 322 operate in accordance with a PtP communication protocol such as the Intel® QuickPath Interconnect (QPI) or the like. The chipset 320 connects to a display device 340 that includes, but is not limited to, liquid crystal display (LCD), cathode ray tube (CRT) display, or any other form of visual display device.

In addition, the chipset 320 connects to one or more buses 350 and 355 that interconnect the various modules 374, 360, 362, 364, and 366. Buses 350 and 355 may be interconnected together via a bus bridge 372 if there is a mismatch in bus speed or communication protocol. The chipset 320 couples with, but is not limited to, a non-volatile memory 360, a mass storage device(s) 362, a keyboard/mouse 364 and a network interface 366. The mass storage device 362 includes, but is not limited to, a solid state drive, a hard disk drive, an universal serial bus flash memory drive, or any other form of computer data storage medium. The network interface 366 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 3 are depicted as separate blocks within the system 300, the functions performed by some of these blocks may be integrated within a single semiconductor circuit or may be implemented using two or more separate integrated circuits. For example, although the cache memory 316 is depicted as a separate block within the processor 310, the cache memory 316 can be incorporated into the processor core 312 respectively. The system 300 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
   a processing unit comprising:
   a data cache memory having a plurality of cache memory lines;
   a tag memory having a first partition and a second partition, wherein the first partition comprises entries associated with cache memory lines having an even set index, and wherein the second partition comprises entries associated with cache memory lines having an odd set index;
a processing core; and
a cache memory;
the processing unit to:
determine that data of a vector memory operand is cached in two adjacent cache memory lines based on a size of the vector memory operand and a starting address of a first byte and a second byte of the vector memory operand;
determine, based on a set index in a linear address of the vector memory operand, that the two adjacent cache memory lines comprise a first cache memory line with an even set index and a second cache memory line with an odd set index; and
pre-fetch, using a single data cache memory execution slot responsive to the determination that the two adjacent cache memory lines comprise the first cache memory line with the even set index and the second cache memory line with the odd index, the first cache memory line from the first partition and the second cache memory line from the second partition.

2. The apparatus of claim 1, wherein the processing unit to pre-fetch the two adjacent cache memory lines using the single data cache memory execution slot is to:
compare a physical address of the data of the vector memory operand with the entries in the first partition and the entries in the second partition.

3. The apparatus of claim 2, wherein the processing unit to pre-fetch the two adjacent cache memory lines using the single data cache memory execution slot is further to:
generate a corresponding cache miss indication for the first partition and the second partition based on the comparison of the physical address of the data of the vector memory operand with the entries in the first partition and the entries in the second partition.

4. The apparatus of claim 3, wherein the processing unit to pre-fetch the two adjacent cache memory lines using the single data cache memory execution slot is further to:
allocate a corresponding fill buffer for the first partition and the second partition based on the corresponding generated cache miss indication for the first partition and the second partition.

5. The apparatus of claim 3, wherein the processing unit to pre-fetch the two adjacent cache memory lines using the single data cache memory execution slot is further to:
generate a corresponding cache miss request for the first partition and the second partition based on the corresponding generated cache miss indication for the first partition and the second partition.

6. The apparatus of claim 2, further comprising:
a translation look aside buffer (TLB) to convert a linear address of the vector memory operand to the physical address of the vector memory operand.

7. A system comprising:
a memory; and
a processing unit coupled with the memory, the processing unit comprising:
a data cache memory having a plurality of cache memory lines; and
a tag memory having a first partition and a second partition, wherein the first partition comprises entries associated with cache memory lines having an even set index, and wherein the second partition comprises entries associated with cache memory lines having an odd set index; and
logic to:
determine that data of a vector memory operand is cached in two adjacent cache memory lines based on a size of the vector memory operand and a starting address of a first byte and a second byte of the vector memory operand;
determine, based on a set index in a linear address of the vector memory operand, that the two adjacent cache memory lines comprise a first cache memory line with an even set index and a second cache memory line with an odd set index; and
pre-fetch, using a single data cache memory execution slot responsive to the determination, the first cache memory line from the first partition and the second cache memory line from the second partition.

8. The system of claim 7, wherein the logic to pre-fetch the two adjacent cache memory lines using the single data cache memory execution slot is to:
determine the size of the data; and
compare a physical address of the data of with the entries in the first partition and the entries in the second partition.

9. The system of claim 8, wherein the logic to pre-fetch the two adjacent cache memory lines using the single data cache memory execution slot is further to:
generate a corresponding cache miss indication for the first partition and the second partition based on the comparison of the physical address of the data with the entries in the first partition and the entries in the second partition.

10. The system of claim 9, wherein the logic to pre-fetch the two adjacent cache memory lines using the single data cache memory execution slot is further to:
allocate a corresponding fill buffer for the first partition and the second partition based on the corresponding generated cache miss indication for the first partition and the second partition.

11. The system of claim 10, wherein the logic to pre-fetch the two adjacent cache memory lines using the single data cache memory execution slot is further to:
generate a corresponding cache miss request for the first partition and the second partition based on the corresponding generated cache miss indication for the first partition and the second partition.

12. The system of claim 7, wherein the processing unit further comprises:
a translation look aside buffer (TLB) to convert a linear address of the data to a physical address of the data.

13. The system of claim 7, wherein the data cache memory is one of a level one (L1), a level two (L2), and a level three (L3), data cache memory.

14. A method comprising:
determining that data of a vector memory operand is cached in two adjacent cache memory lines based on a size of the vector memory operand and a starting address of a first byte and a second byte of the vector memory operand;
determining, based on a set index in a linear address of the vector memory operand, that the two adjacent cache memory lines comprise a first cache memory line with an even set index and a second cache memory line with an odd set index; and
pre-fetching using a single data cache memory execution slot responsive to the determination that the two adjacent cache memory lines comprise the first cache memory line with the even set index and the second cache memory line with the odd index, the first cache memory line from a first partition and the second cache memory line from a second partition.

15. The method of claim 14, wherein pre-fetching the two adjacent cache memory lines using the single data cache memory execution slot comprises:
   determining the size of the data; and
   comparing a physical address of the data of with entries in the first partition and entries in the second partition, wherein the first partition comprises entries associated with cache memory lines having an even set index, and wherein the second partition comprises entries associated with cache memory lines having an odd set index.

16. The method of claim 15, wherein pre-fetching the two adjacent cache memory lines using the single data cache memory execution slot further comprises:
   generating a corresponding cache miss indication for the first partition and the second partition based on the comparison of the physical address of the data of the vector memory operand with the entries in the first partition and the entries in the second partition.

17. The method of claim 16, wherein pre-fetching the two adjacent cache memory lines using the single data cache memory execution slot further comprises:
   allocating a corresponding fill buffer for the first partition and the second partition based on the corresponding generated cache miss indication for the first partition and the second partition.

18. The method of claim 17, wherein pre-fetching the two adjacent cache memory lines using the single data cache memory execution slot further comprises:
   generating a corresponding cache miss request for the first partition and the second partition based on the corresponding generated cache miss indication for the first partition and the second partition.

19. The method of claim 18, wherein pre-fetching the two adjacent cache memory lines using the single data cache memory execution slot further comprises:
   translating a linear address of the data to the physical address of the data.

20. The method of claim 14, wherein the data cache memory is one of a level one (L1), a level two (L2), and a level three (L3), data cache memory.

* * * * *